United States Patent
Tolhurst

(10) Patent No.: US 7,753,388 B2
(45) Date of Patent: Jul. 13, 2010

(54) FRONT WHEEL DRIVE RECUMBENT BICYCLE

(76) Inventor: John Irven Tolhurst, 2A Bisbane Terrace, Perth, Western Australia (AU) 6000

( * ) Notice: Subject to any disclaimer, the term of this patent is extended or adjusted under 35 U.S.C. 154(b) by 344 days.

(21) Appl. No.: 11/857,053

(22) Filed: Sep. 18, 2007

(65) Prior Publication Data

US 2009/0072511 A1   Mar. 19, 2009

(51) Int. Cl.
| | |
|---|---|
| B62K 21/20 | (2006.01) |
| B62K 21/22 | (2006.01) |
| B62K 25/28 | (2006.01) |
| B62K 25/08 | (2006.01) |
| B62K 25/10 | (2006.01) |

(52) U.S. Cl. .................. 280/276; 280/278; 280/284; 280/288.1

(58) Field of Classification Search ......... 280/275–280, 280/281.1, 288.1, 283, 284
See application file for complete search history.

(56) References Cited

U.S. PATENT DOCUMENTS

| | | | | |
|---|---|---|---|---|
| 453,514 | A * | 6/1891 | Shier ........................ | 280/275 |
| 618,627 | A * | 1/1899 | Travis ....................... | 280/284 |
| 709,718 | A * | 9/1902 | Monahan ................... | 280/284 |
| 1,043,269 | A * | 11/1912 | Stephenson ............... | 280/284 |
| 1,130,828 | A * | 3/1915 | Kuehn ...................... | 280/277 |
| D277,744 | S | 2/1985 | Traylor | |
| 5,370,411 | A * | 12/1994 | Takamiya et al. .......... | 280/284 |
| 5,441,292 | A * | 8/1995 | Busby ....................... | 280/284 |
| 5,509,678 | A * | 4/1996 | Ullman et al. ............. | 280/281.1 |
| 5,833,258 | A * | 11/1998 | Maestripieri .............. | 280/275 |
| 6,406,048 | B1 * | 6/2002 | Castellano ................. | 280/284 |
| 6,497,426 | B2 * | 12/2002 | VanPelt .................... | 280/287 |
| 6,565,106 | B2 * | 5/2003 | Lopez ....................... | 280/203 |
| 7,416,203 | B2 * | 8/2008 | Tollhurst .................. | 280/259 |

FOREIGN PATENT DOCUMENTS

| | | |
|---|---|---|
| DE | 3700388 | 7/1988 |
| DE | 19722973 | 12/1998 |
| TW | 485929 | * 5/2002 |

* cited by examiner

*Primary Examiner*—Lesley Morris
*Assistant Examiner*—Wesley Potter
(74) *Attorney, Agent, or Firm*—Leyendecker & Lemire, LLC; Kurt Leyendecker

(57) ABSTRACT

Embodiments of the present invention comprise a lightweight front wheel drive recumbent road bicycle and an associated frame. A front triangle is provided to which the drive train of a standard road group can be attached and utilized. A telescoping tube assembly is provided in the front triangle to permit the distance of a bottom bracket and crankset from a seat pan to be adjusted for riders of different sizes. The handlebar is coupled to an end of the telescoping tube assembly and no traditional handlebar stem attached to a steering tube is utilized, so that the structure provides maximum stiffness to better capture the input of the arms and upper body when maximum power is required. The seat pan and a seat back are integrated with the main frame truss structure to help ensure the maximum transfer of the rider's energy to the drive train.

17 Claims, 9 Drawing Sheets

US 7,753,388 B2

FRONT WHEEL DRIVE RECUMBENT BICYCLE

FIELD OF THE INVENTION

The present invention relates generally to bicycles.

BACKGROUND

The huge majority of bicycles sold and available in the marketplace today are of the diamond frame type or derivatives that maintain a substantially upright riding position. Recumbent bicycles which place a rider in a supine orientation have been available for years but despite offering many advantages to diamond frame type bicycles (such as but not limited to more comfortable riding position, and lower wind resistance) have been unable to capture a substantial portion of the bicycle market.

Prior art recumbent bicycles have failed to make significant gains relative to traditional bicycles in part because the advantages they offer have been outweighed or over shadowed by the disadvantages of recumbent bicycles especially among serious enthusiast cyclists who are willing to spend the amount of money on a bicycle that is typically necessary to purchase a high end recumbent. First, recumbents typically have very long wheelbases that hinder handling and the ability to maneuver through obstacles in a manner that would be easy for an upright-style racing bicycle. Second, recumbents do not traditionally climb, accelerate or sprint very well as it is difficult to make adequate use of a rider's upper body and arm muscles. Third, recumbents tend to utilize specialized components that are not readily available or are not easily upgraded. Furthermore, many style conscience riders are hesitant to ride recumbents because of their wholly non-traditional look.

Several improved recumbent designs have been proposed that mitigate if not eliminate some of the real and perceived disadvantages listed above. One particularly notable example is a recumbent that is fashioned from a bicycle frame of a traditional mountain bicycle by using a suitable conversion kit. The conversion kit is described in U.S Pat. No. 7,416,203 entitled Assembly for Converting Standard Bicycle into a Recumbent and A Bicycle Incorporating the Assembly filed on Mar. 31, 2006 and having the same inventor as the present application. One of the biggest issues with this solution is that it does not have the aesthetic look that many cyclists desire. Furthermore, there is greater difficulty obtaining an ideal configuration for a particular rider as the frame is not designed with a recumbent conversion in mind. Another important limitation of many prior art recumbent bicycles is that the circuitous path of the structure connecting handlebar to bottom bracket has many components, each adding opportunities for flex and associated losses of efficiency in the transfer of power applied by a rider via his upper body through the handlebars. Finally, the traditional mountain bicycle frame is not engineered for the different loads associated with a recumbent bicycle and as such may not in some circumstances have the desired longevity when used as a recumbent or, as is more likely the case, the frame will be much heavier than is necessary for recumbent usage.

DETAILED DESCRIPTION

Figure 1:
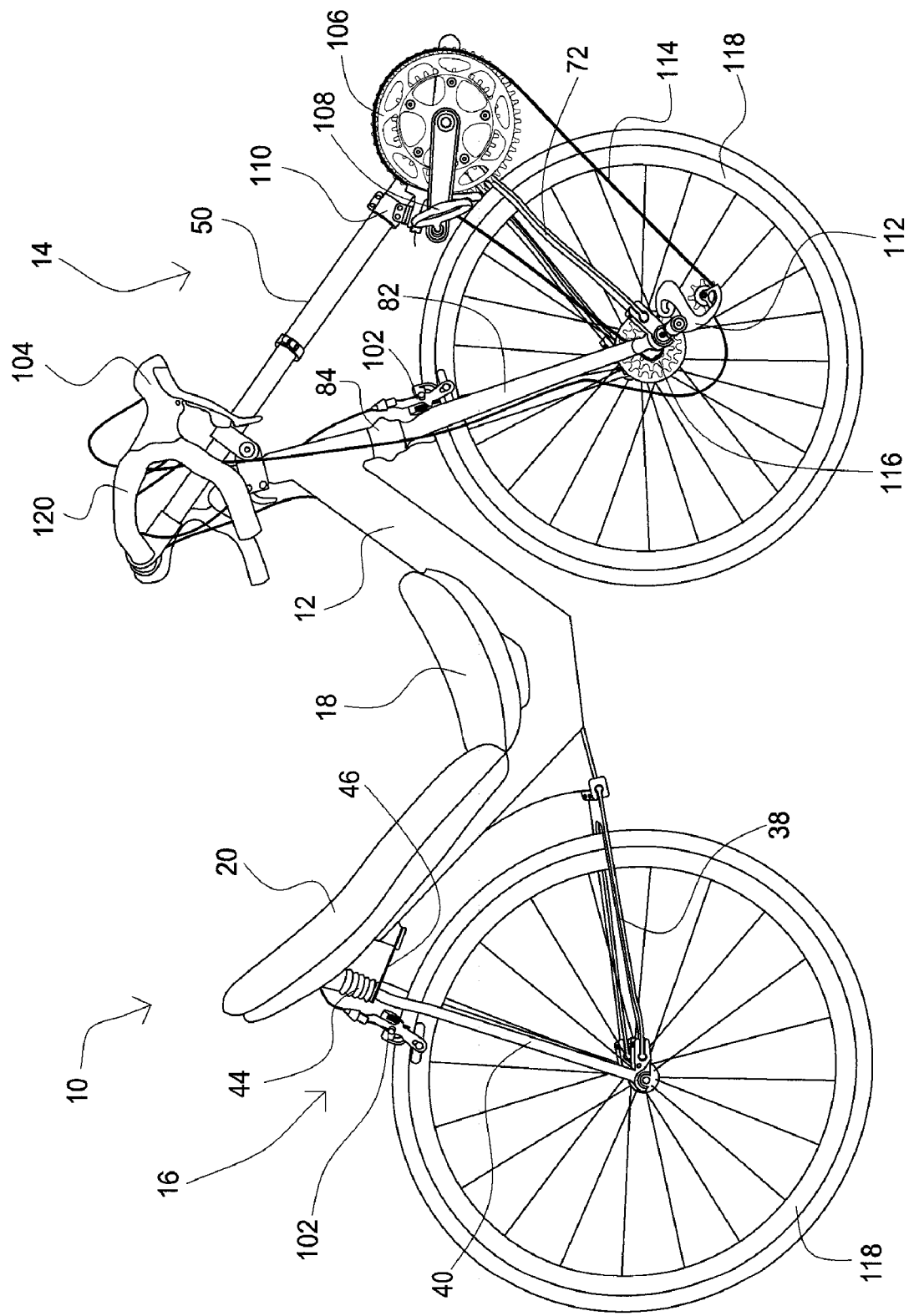
FIG. 1 is an isometric view of a front wheel drive recumbent bicycle according to one embodiment of the present invention.

Embodiments of the present invention comprise a lightweight front wheel drive recumbent road bicycle.

The main frame comprises a generally U-shaped truss that extends: rearwardly and downwardly from a head tube along a front truss portion; generally horizontally for a short distance along a middle truss portion; and upwardly and rearwardly along a seat truss portion. The seat structure, which includes a seat pan, and a seat back, is fully integrated with the truss with a top wall of the seat truss portion also comprising the seat back. The seat pan spans between the seat truss portion and the front truss portion above the middle truss portion. The seat pan and the seat back are substantially rigid and non-adjustable permitting a user to maximize the transfer of pedal force to the pedals by pushing and bracing his/her back against the seat back. Advantageously, energy utilization of the rider is maximized and the climbing ability of the embodiment is improved over many prior art recumbent bicycles.

The rear triangle of certain embodiments comprise a pair of carbon fiber composite rear wheel stays that are contoured to flex when subject to forces transferred from a rear wheel attached to a pair of rear dropouts at the distal end of the stays. At their proximal ends the spring stays are mechanically coupled to a webbed protrusion that is secured to the back and underside of the middle truss portion and the seat truss portion respectively. A pair of seat stays extend upwardly towards a distal section of the seat truss portion wherein the top end of the seat stays are coupled to the seat truss portion by way of a leaf spring that spans generally horizontally between the truss and a connection proximate the top of an intersection of the seat stays. The top of the stays also rest against an elastomeric dampener which absorbs the loads transferred from the rear wheel.

The front triangle comprises a set of carbon fiber composite chain stays, a telescoping tube assembly, a front fork and a steering tube shock absorber. The composite chainstays are coupled to the dropouts of the front fork by a pair of chainstay dropouts that interface with the fork dropouts and are secured in place by the same quick release skewer that holds the front drive wheel in place. The opposing end of the chainstays is fixedly secured to the bottom bracket shell by way of a specially designed ring clamp bracket.

A distal tube of a telescoping tube assembly is welded to the bottom bracket shell. A proximal tube, made of carbon fiber composite in many embodiments, is tightly received inside the distal tube with a ring clamp provided at the top of the distal tube to securely clamp the proximal tube in place. At the top end of the proximal tube a handlebar mounting bracket is adhesively secured thereto to directly receive a suitable handlebar thereby eliminating the need for a separate handlebar stem as is required in almost all other upright-style bicycles and prior art recumbents. This configuration offers the advantage of more directly utilizing upper body energy of the rider that is input through the handlebar and transferred more directly to the bottom bracket and associated crankset thereby improving the climbing and sprinting ability of the embodiments of the bicycle compared with prior art recumbents.

The chainstays are coupled to the bottom bracket shell at their distal ends by way of a pair of ring clamps that circumscribe the exterior of the shell and are normally tightened during use but can be loosened as necessary to permit the chainstays to pivot relative to the bottom bracket while the length of the telescoping tube assembly is being adjusted for a particular rider. The proximal ends of the chainstays are mechanically coupled to a pair of front dropouts that form the distal ends of the blades of the front fork.

The front fork comprises the respective fork blades that are coupled to a steering tube or a combination of a steering tube and shock when the front of the frame is suspended. The steering tube extends through a head tube of the main frame truss structure and is pivotally coupled to the main frame typically by way of a pair of bearing assemblies. On the portion of the steering tube that extends upwardly above the head tube, a steering tube mounting bracket, which is also coupled to the proximal tube of the telescoping tube assembly, is secured therearound. The bracket is typically adapted to slide along the proximal tube and the steering tube when associated ring clamps are loosened. Additionally, the angle between the steering tube and the proximal tube can be adjusted. Advantageously, by loosening the various fasteners on the steering tube mounting bracket, the ring clamp between the distal and proximal tubes, the chainstay ring clamps encircling the bottom bracket shell, a user can quickly adjust the front triangle to size the frame for users of different heights. Once the front triangle is adjusted the various clamps and fasteners can be tightened to create a substantially rigid front triangle excepting the chainstays and the shock, which flex to provide for the front suspension, that enhances power transfer and handling characteristics.

Furthermore, because the handlebar is secured to the handlebar mounting bracket at the end of the telescoping tube assembly the relative position of the handlebar can be easily adjusted when the front triangle is being adjusted for a user. Traditionally, the reach between a person's torso and the handlebar can only be adjusted by changing out stems of different sizes, which are connected directly to the steering tube. Using embodiments of the present recumbent frame and bicycle the reach can be adjusted as part of the overall sizing process thereby affording the user a more quickly tailored fit.

The various embodiments and variations thereof illustrated in the accompanying Figures and/or described herein are merely exemplary and are not meant to limit the scope of the invention. It is to be appreciated that numerous variations of the invention have been contemplated as would be obvious to one of ordinary skill in the art with the benefit of this disclosure. Rather, the scope and breadth afforded this document should only be limited by the claims provided herein while applying either the plain meaning to each of the terms and phrases in the claims or the meaning clearly and unambiguously provided in this specification.

Terminology

The terms and phrases as indicated in parenthesis (" ") in this section are intended to have the meaning ascribed to them in this section applied to them throughout this document including the claims unless clearly indicated otherwise in context.

The term "or" as used in this specification and the appended claims is not meant to be exclusive rather the term is inclusive meaning "either or both".

References in the specification to "one embodiment", "an embodiment", "a preferred embodiment", "an alternative embodiment", "embodiments", "variations", "a variation" and similar phrases means that a particular feature, structure, or characteristic described in connection with the embodiment(s) or variation(s) is included in at least an embodiment or variation of the invention. The appearances of the phrase "in one embodiment" or "in one variation" in various places in the specification are not necessarily all referring to the same embodiment or variation.

The term "couple" or "coupled" as used in this specification and the appended claims refers to either an indirect or direct connection between the identified elements, components or objects. Often the manner of the coupling will be related specifically to the manner in which the two coupled elements interact.

The phrases "upright-style bicycle" and "upright-style bicycle frame" and similar phrases refer to bicycles and frames respectively wherein the rider typically sits upright on a small seat/saddle typically leaning forwardly bracing his/her arm/hands against a pair of handlebars. The "upright-style bicycle" is the most common and well known type of bicycle and accordingly the phrase as used herein does not deviate from its commonly held meaning. In contrast, a "recumbent bicycle" is one in which the rider leans generally rearwardly in a supine position and the seat typically includes a back rest for support.

The term "road bike" refers to the racing style of bike that conforms to the prescriptions of the Union International Cyclist governing competitive road racing.

The term "group" refers to a group of components commonly sold as a set and used to complete the assembly of a road bike on a bicycle frame of the rider's choice. A group typically includes a rear derailleur, a front derailleur, a set of front and rear brakes, brake levers and shifters, hubs and sometimes, a seatpost and/or pedals.

An Embodiment of a Front Wheel Drive Recumbent Bicycle

Figure 2:
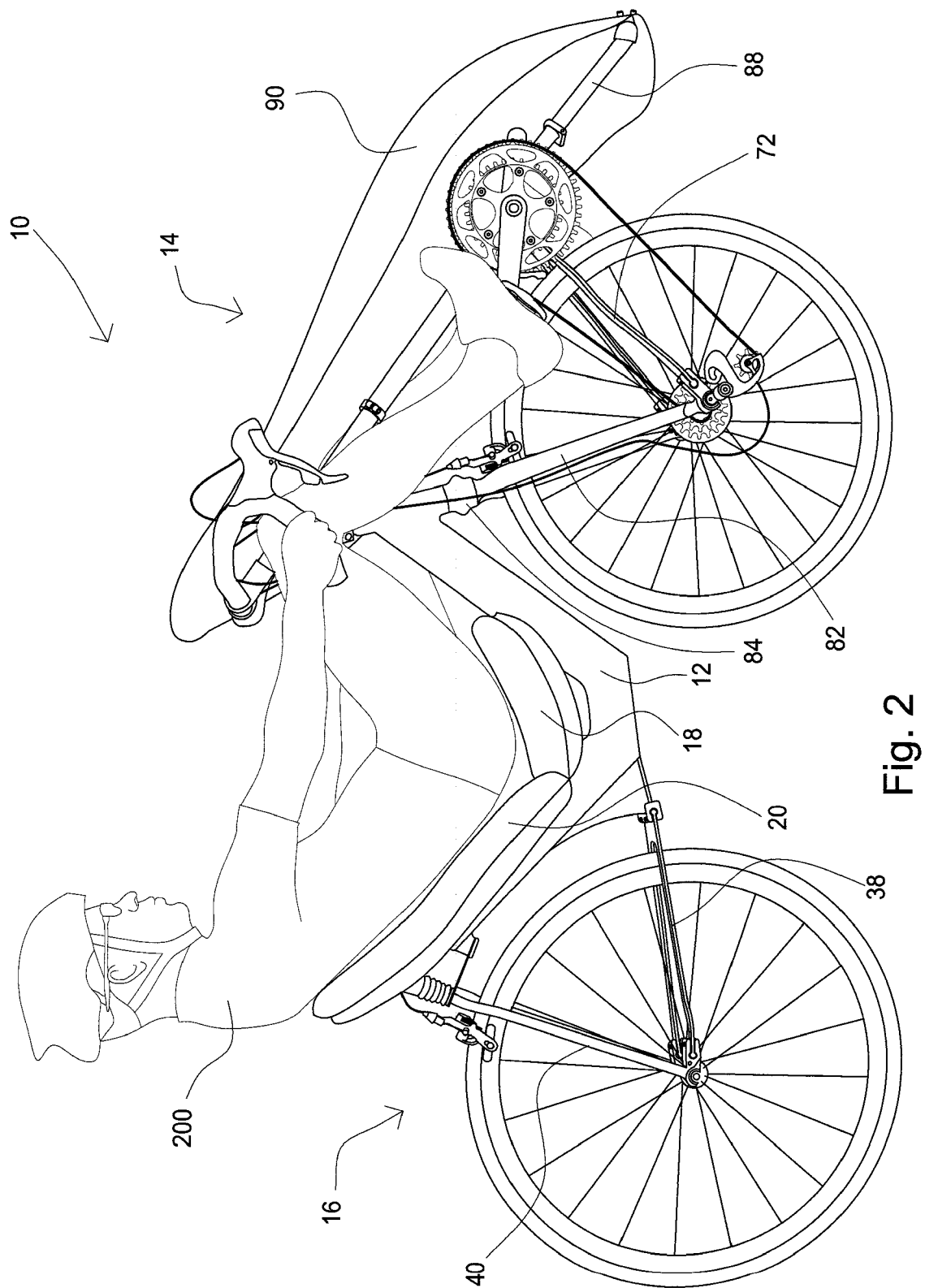
FIG. 2 is an isometric view of a front wheel drive recumbent bicycle including a front fairing illustrating a rider thereon according to one embodiment of the present invention.

An embodiment of a front wheel drive recumbent bicycle 10 is illustrated all or in part in FIGS. 1-15. Referring primarily to FIGS. 1 & 2, the bicycle is characterized by a relatively short wheelbase that is comparable to a traditional upright-style bicycle. Starting at the rear of the bicycle and moving forward, the bicycle includes: a suspended rear triangle 16; a fixed seat pan 18 and back 20 that are fixed and integrated with and form part of the bicycle's main frame truss structure 12; a suspended front triangle 14 that is adjustable to accommodate riders of different sizes. The components of the bicycle including the wheel set 118, the drivetrain (front derailleur 110, rear derailleur 112, crankset 106, pedals 108, cogs or freewheel 116 and chain 114), the handlebars 120 and the brakes 102 including brake/shift levers 104 are all typically interchangeable with those that are found on a traditional upright-style racing bicycle such that specialized components are not required to outfit the recumbent bicycle of the present embodiment.

Figure 3:
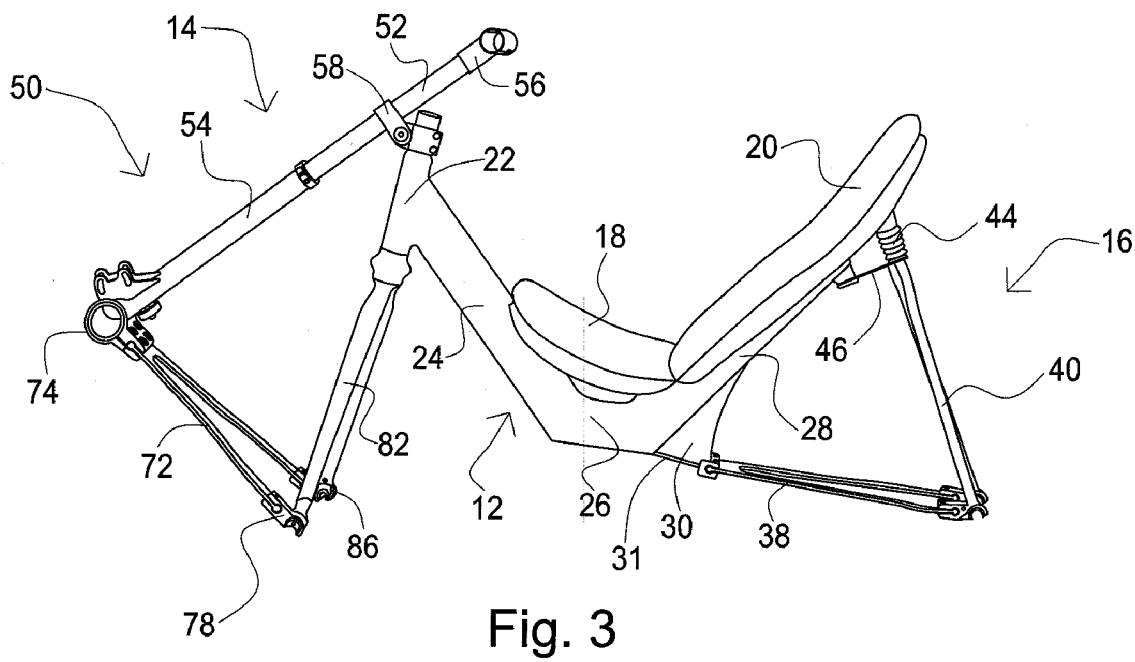
FIG. 3 is an isometric view of a front wheel drive recumbent bicycle frame according to one embodiment of the present invention.

With specific reference to FIGS. 2 & 3, the general position of a rider 200 when seated on the bicycle 10 is shown. The fixed seat back integrated with the relatively large diameter seat truss tube 28 and seat pan spanning between a front truss 24 and the seat truss 28 allows a rider to push off of the seat when pedaling to grain greater leverage and power than is typically possible with other prior art recumbent designs wherein the seat tends to flex if too much force or leverage is applied against it.

In one variation of the bicycle a fairing 90, typically translucent or clear, is coupled to the front triangle 14 to provide for improved aerodynamic characteristics compared with the unfaired variation. To mount the faring a tubular bracket 88 is attached to the front triangle.

Figure 7:
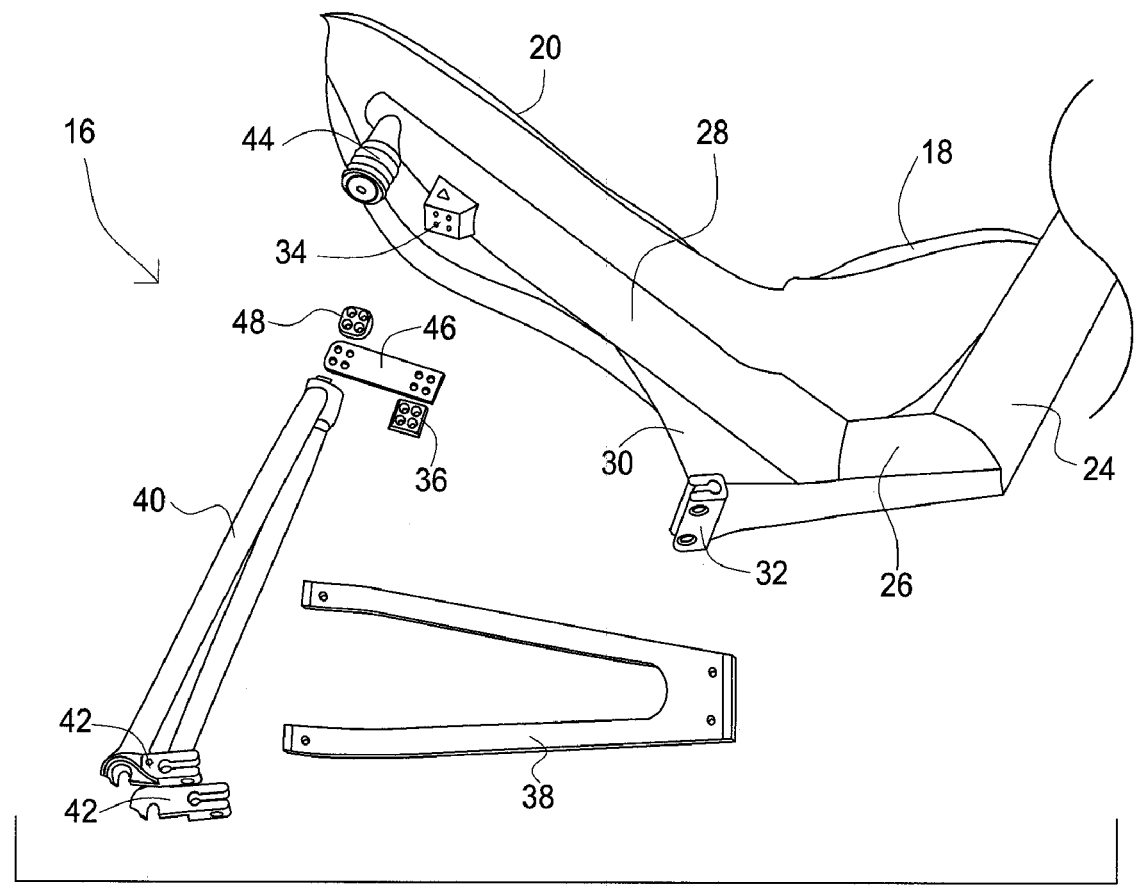
FIG. 7 is an exploded view of the rear triangle according to an embodiment of the present invention.

With reference primarily to FIGS. 3 & 7, the main frame truss structure of the embodiment is described herein below. The main frame truss structure 12 as illustrated comprises essentially four tubes and the seat pan and seat back. The main frame truss structure is typically comprised of aluminum, steel, titanium or composite materials. The various tubes or portions of the frame described herein can be welded together, adhesively bonded together or even unitarily fabricated depending largely on the materials utilized. While the illustrated main frame struss structure comprises a plurality of tubes in other variations the tubes may be replaced as applicable with other structural forms, such as but not limited to I-beams and C-sections.

A head tube 22 is provided through which a steerer tube of the front triangle is typically received. A front truss tube (or portion) 24 extends downwardly and rearwardly from the head tube. In the case of a main frame truss structure comprised of 6061 or 7005 aluminum alloy, the head tube is welded to the front truss portion as are the other truss portions integrally connected.

A middle truss tube (or portion) 26 extends generally rearwardly and horizontally from its point of integration with the front truss tube 24. A horizontally-orientated plate member 31 extends generally horizontally rearwardly from the bottom rear end of middle truss portion and terminates at a rear stay mounting bracket 32 to which the composite rear stays 38 are typically secured as is described below. The plate member is stiffened and strengthened by way of a generally vertically orientated gusset 30 that is secured, typically through welding to the seat truss 28.

The seat truss tube (or portion) 28 extends rearwardly and upwardly from the rear end of the middle truss tube 26 to a termination location where proximate thereto an elastomeric dampener 44 is secured for dampening movement of the suspended rear triangle 16 as is described below. In general, the front, middle and seat truss portions are arranged in the general shape of a "V" or a "U".

Concerning the seat truss tube, in one embodiment during fabrication a top portion of the tube is removed along a substantial portion of its length, or alternatively, the seat truss portion is formed as an upwardly facing C-section. The seat back 20, which in some variations is made of a similar metallic material as the truss portions, is welded or otherwise integrally secured over the opening such as to re-form the tube and structurally integrate the seat back into the main frame truss structure.

The seat pan 18 is typically integrally secured to the seat back typically by way of welds at a rear end thereof and extends forwardly to a front end that is integrally secured to the front truss portion also typically by way of welds when the frame truss structure comprises a metallic material. Further, the seat pan extends over and is spaced above the middle truss portion 26. Both the seat back and the seat pan have about downwardly turned or formed flanges that form about a 60-90 degree angle with the main generally planer seating portions of both the pan and the back. Effectively, the flanges act to stiffen the seat pan and seat back thereby significantly increasing their relative contribution to the over all strength and stiffness of the main frame truss structure especially in the case of the seat pan.

With reference primarily to FIGS. 6, 7 & 11-13, the rear triangle is described herein. The rear triangle comprises: (i) a pair of integrated composite rear wheel stays 38; a pair of integrated seat stays 40 including a corresponding pair of rear wheel dropouts 42; and a titanium leaf spring 46 including associated mounting brackets 36 & 48 and fasteners.

The rear wheel stays 38 are typically comprised from a carbon fiber/epoxy composite material that is relatively flat in a generally horizontal plane or has a shallow contour. Accordingly, the stays resiliently flex when subject to loading by way of the rear wheel as the bicycle is ridden over the road. Essentially, the stays perform the biasing or spring function of the rear suspension.

Figure 12:
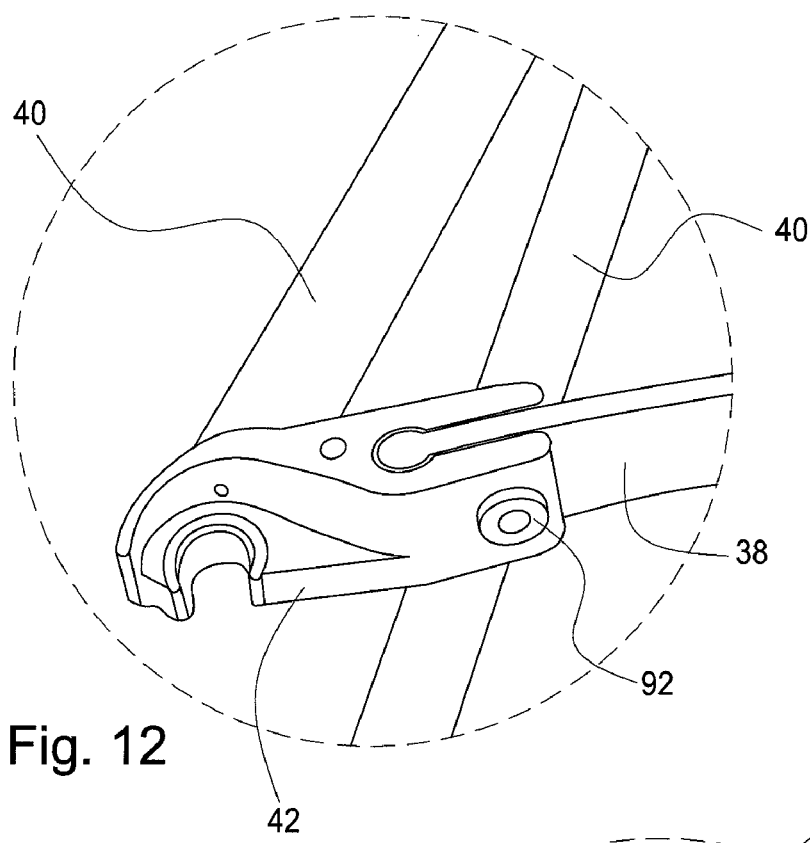
FIG. 12 is an isometric illustration of the rear dropouts of the rear triangle according to an embodiment of the present invention.
Figure 13:
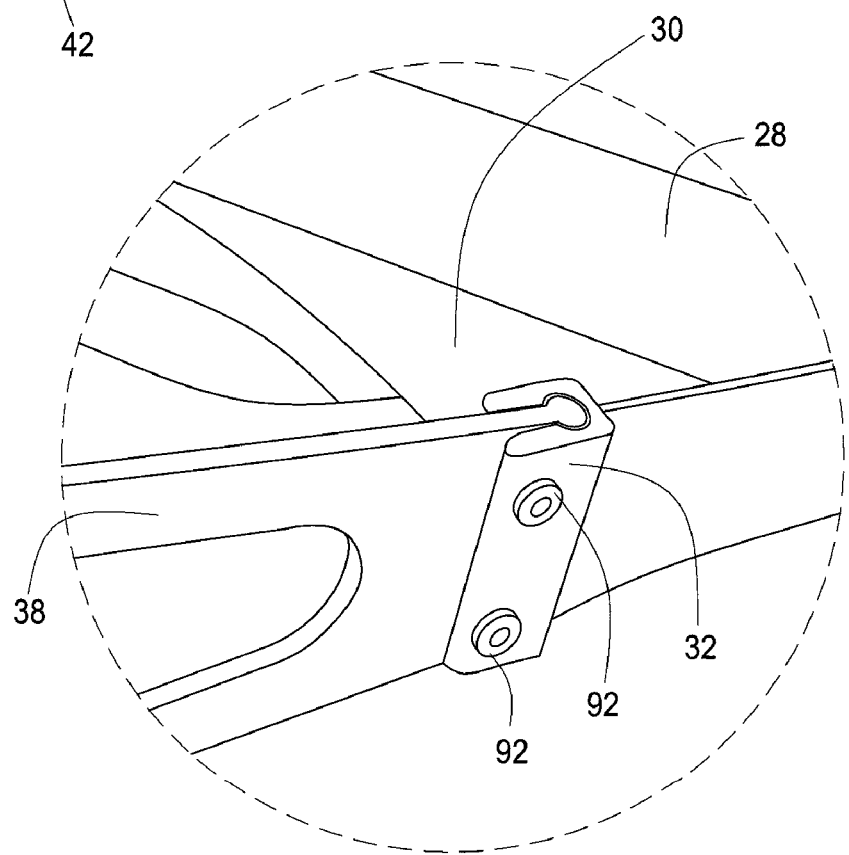
FIG. 13 is an isometric illustration of the rear stay mounting bracket of the main frame truss structure according to an embodiment of the present invention.

The ends of the stays are molded with generally cylindrical ends that are adapted to be received into slots in the rear stay mounting bracket 32 and the rear wheel dropouts 42 as best illustrated in FIGS. 12 & 13. The cylindrical portions are slid into correspondingly shaped cavities at the end of the slots such that longitudinal forces acting upon the stays will not pull either end of the stays from the respective slots. To prevent the stays from sliding laterally from the respective slots, fasteners 92 are provided that pass through associated openings in the dropouts and mounting bracket as well as the ends of the stays.

Figure 11:
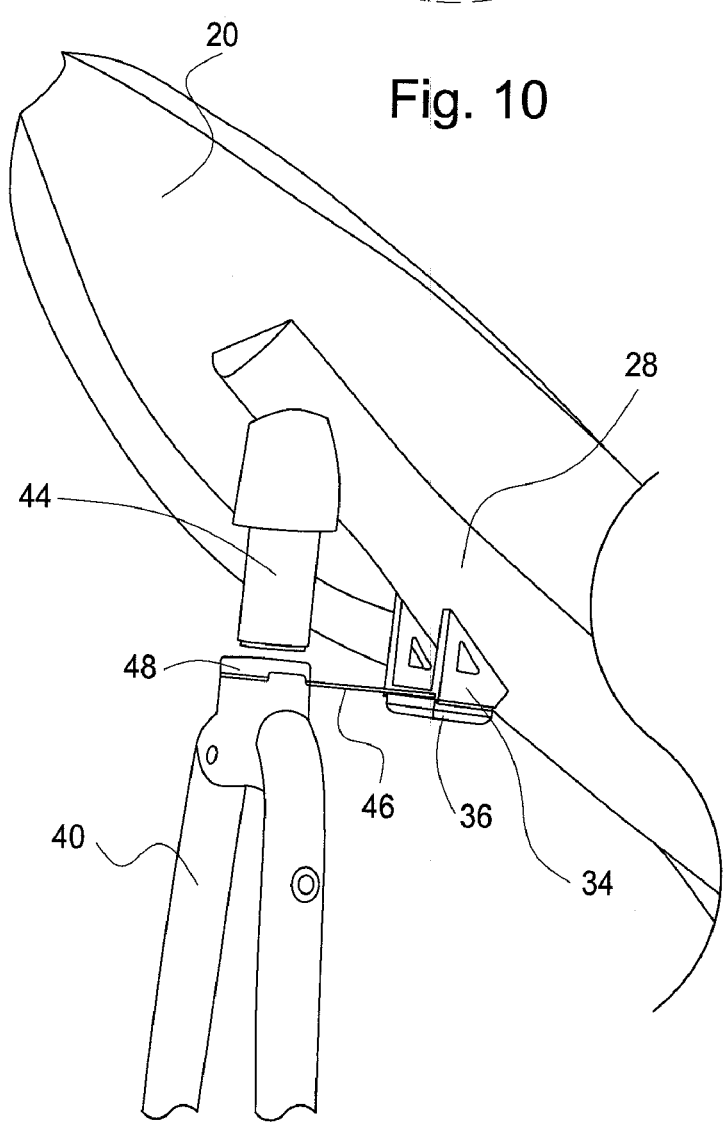
FIG. 11 is an isometric illustration of the interface of the rear triangle with the main frame truss structure including the elastomeric dampener according to an embodiment of the present invention.

The rear dropouts 42 are typically integral with the seat stays 40. In one variation the aluminum dropouts are welded to respective seat stays. Each of the pair of seat stays are further joined at a proximal end directly below the elastomeric dampener 44 as best illustrated in FIG. 11. The top end of the seat stays is, however, not directly connected with the dampener but rather is coupled with the seat truss tube 28 by way of a short metallic (typically titanium) leaf spring 46. The leaf spring permits the seat stays to move upwardly as necessary but inhibits side to side or lateral movement of the seat stays. As best shown in FIG. 7, four screw holes are provided through each end of the leaf spring for receiving fasteners therethrough. Mounting brackets 36 & 48 are also provided with corresponding fasteners holes. Using the mounting brackets and fasteners, one end of the leaf spring is secured to a bracket 34 secured to the seat truss tube 28 and the other end of the spring is secured to the top of the seat stays 40. As best shown in FIG. 11, when the bicycle is not loaded, such as with a rider, there is typically a small space between the top of the mounting bracket 48 associated with the seat stays and the bottom of the elastomeric bumper.

When the bicycle is loaded, the top of the seat stay mounting bracket 48 rests against the elastomeric dampener and as loads are encounter during use that cause the rear wheel stays 38 to flex, the seat stays and the associated mounting bracket are driven into the elastomeric dampener 44 thereby dampening the movement of the suspension and the transfer of the associated force to the rider. The elastomeric dampener is typically comprised of a polyurethane material of which the durometer can be varied depending on the desired dampening characteristics and the weight of the rider.

With reference primarily to FIGS. 4, 5, 8-10 & 14, the front triangle 14 is described herein. The front triangle comprises: (i) a fork assembly including one of a steerer tube or a steerer tube/shock combination 84, and a pair of fork blades 82 terminating in fork front dropouts 86; (ii) a pair of integrated composite front chainstays 72 including a pair of chainstay dropouts 78 at a proximal end and a bottom bracket shell mounting bracket at a distal end that comprises a pair of bottom bracket shell ring clamps 74; (iii) a telescoping tube assembly 50 terminating at a bottom bracket shell 60 at a first end and a handlebar mounting bracket 56 at a second end. The front triangle further includes a steering tube mounting bracket 58 that is secured along a proximal tube 52 of the telescoping tube assembly.

Figure 14:
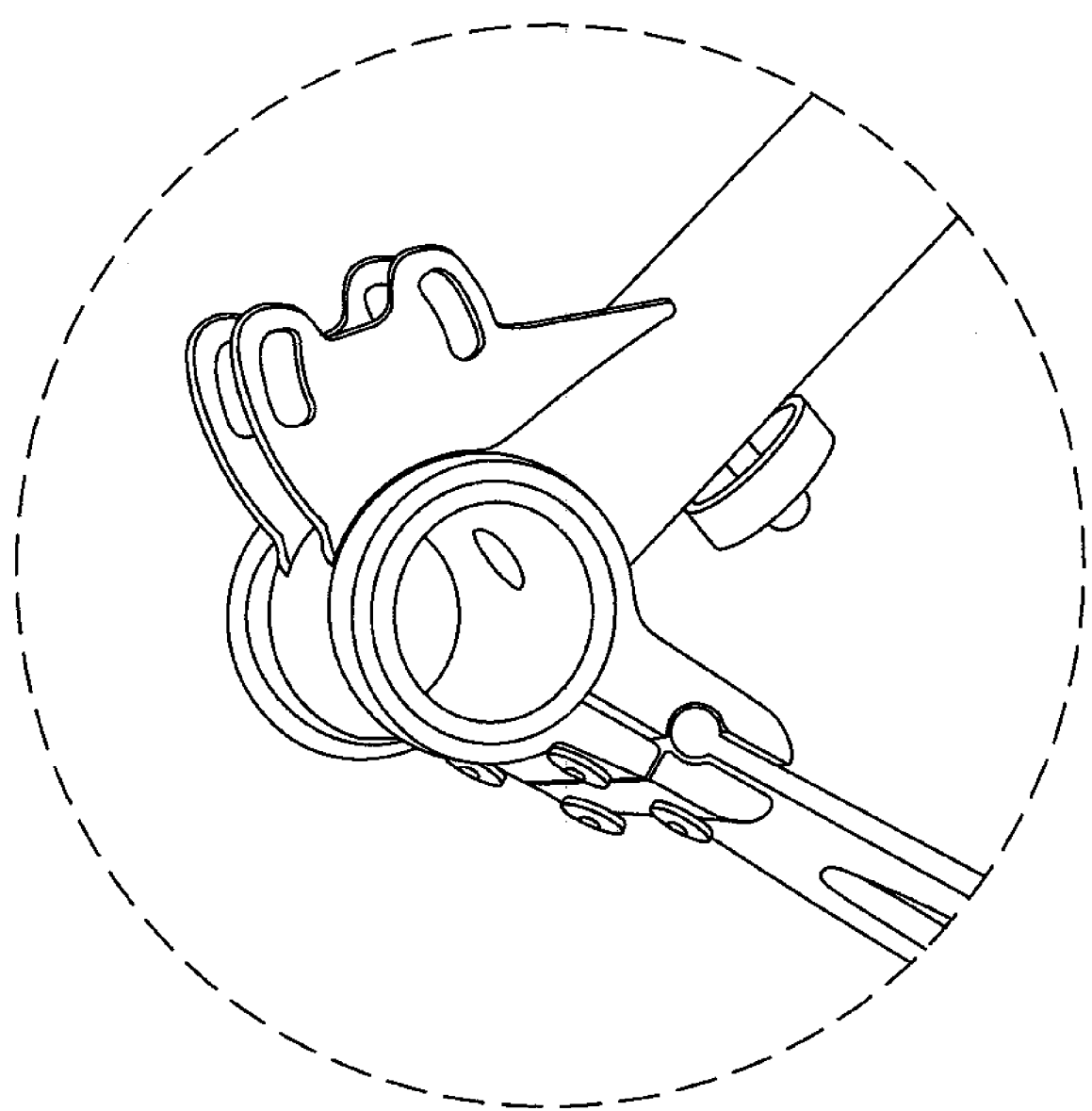
FIG. 14 is an isometric illustration of the bottom bracket shell and bottom bracket shell ring clamps of the front triangle according to an embodiment of the present invention.

The chainstays 72 are substantially similar in material and construction to the rear wheel stays 38 except for different dimensions and spring rates as dictated by their use to suspend the front wheel instead of the rear wheel. For instance, the front stays, which are not as highly loaded as the rear wheel stays, are generally less stiff with a lower spring rate than the rear wheel stays. The proximal ends of the stays attach to the chainstay dropouts 78 in substantially a similar fashion that the distal ends of the rear wheel stays attach to the rear dropouts 42. The integrated distal end of the chainstays also includes a laterally extending cylindrical terminus similar to the proximal end of the rear wheel stays; however, rather than slide laterally into the mounting bracket it is clamped into the bottom bracket shell mounting bracket assembly, which comprises two ring clamps 74 and an associated clamp bracket 76 adapted to hold the distal end of the chainstay in place as well as join the two ring clamps together as is best illustrated in FIG. 14. Fastener openings as applicable are provided in the appropriate sections of the two ring clamps and the clamp bracket so that the elements can be joined together about the distal end of the chainstay thereby clamping it firmly in place.

However, before the chainstays are attached to the bottom bracket shell mounting bracket assembly, the oversized ring clamps are placed over the respective left and right ends of the telescoping tube assembly's bottom bracket shell 60. The large contact area of the ring clamps on the bottom bracket shell helps ensure that when the ring clamps are tightened, the relative angle of the chainstay to the telescoping tube will not change during the bicycle's use. Other prior art pivotal attachment means have a greater likelihood of shifting during use especially when significant forces are applied to the crankset, such as during a hill climb or sprint. Advantageously, the clamps can be loosened to permit the telescoping tube and chainstays to pivot relative to each other when adjusting the size of the front triangle to fit the bicycle to riders of different sizes.

Figure 8:
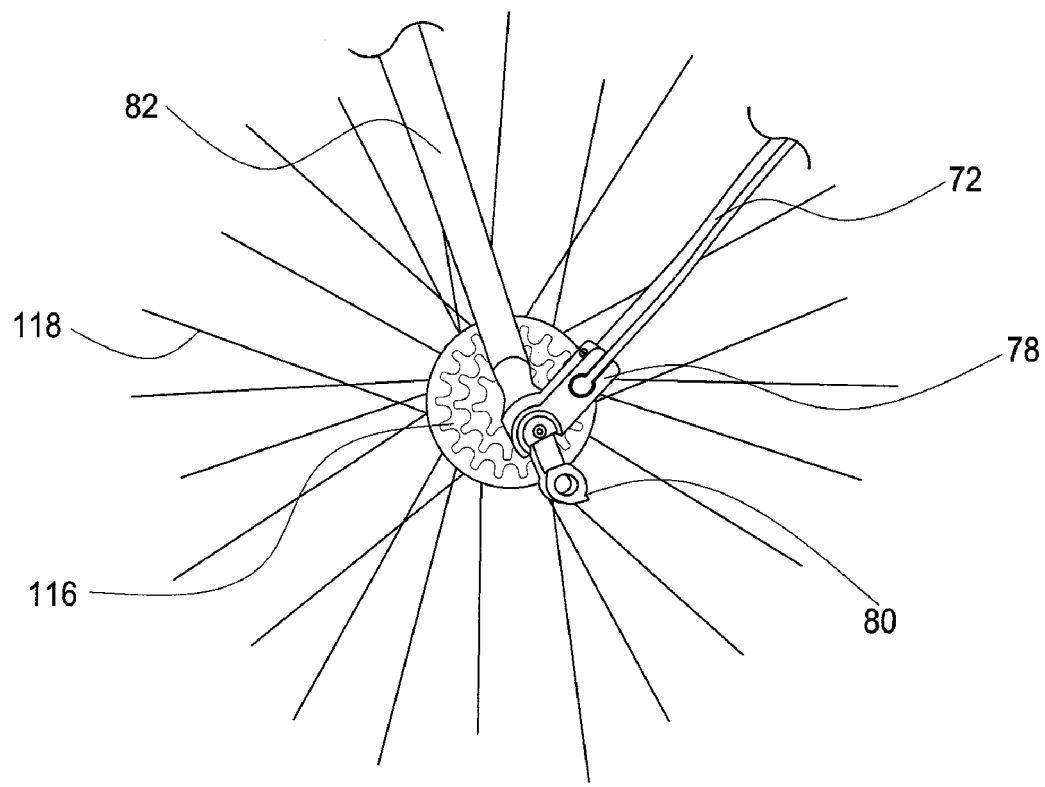
FIG. 8 is an isometric view of the front wheel and chainstay dropouts of the front triangle with a front wheel attached thereto according to an embodiment of the present invention.
Figure 9:
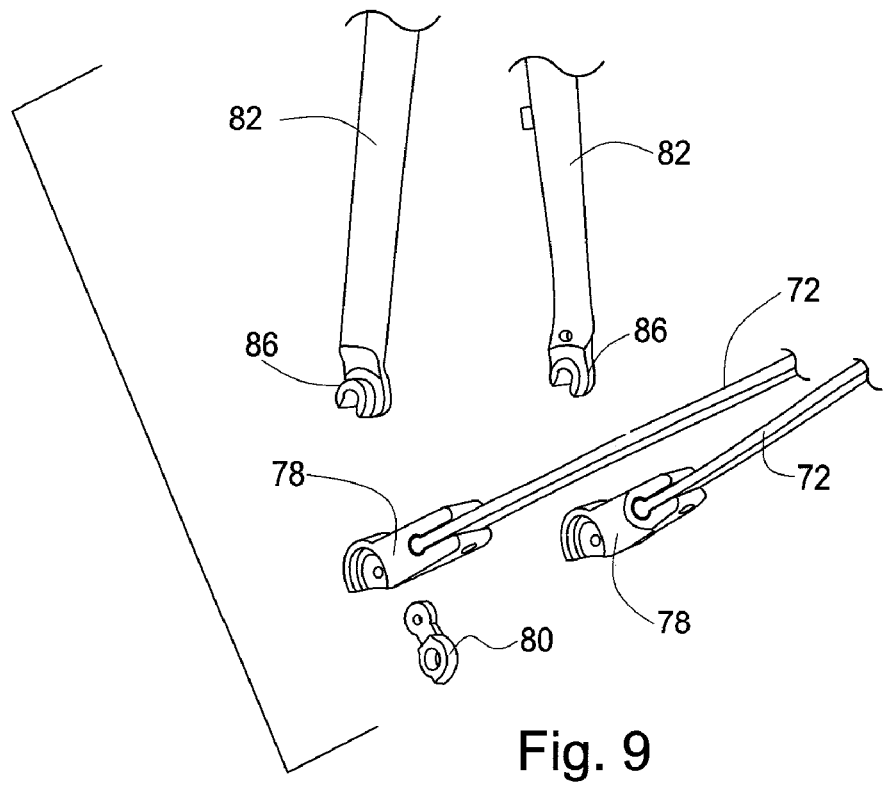
FIG. 9 is an exploded isometric view of the front wheel and chainstay dropouts of the front triangle according to an embodiment of the present invention.

The proximal end of the chainstays 72 are best illustrated in FIGS. 8 & 9, where the ends of the stays are received in respective slots of the left and right chainstay dropouts 78. The dropouts are recessed on both their inner and outer faces. The inner faces interface with outer face protrusions on the fork blade dropouts 86. Typically, a rear derailleur hanger 80 is received within the inner face recess of the right chainstay dropout 78 which also locates the derailleur hanger so it cannot pivot around the axle axis and so that adjustments to the front triangle can be made while preserving the correct orientation of the derailleur and the bottom bracket and ensuring no additional adjustments are necessary to the rear derailleur. The hanger is held in place by way of a quick release skewer (not shown) that also secures the front wheel in place. The ends of the quick release skewers are also typically at least partially received into the outer face recesses when tightened.

Figure 4:
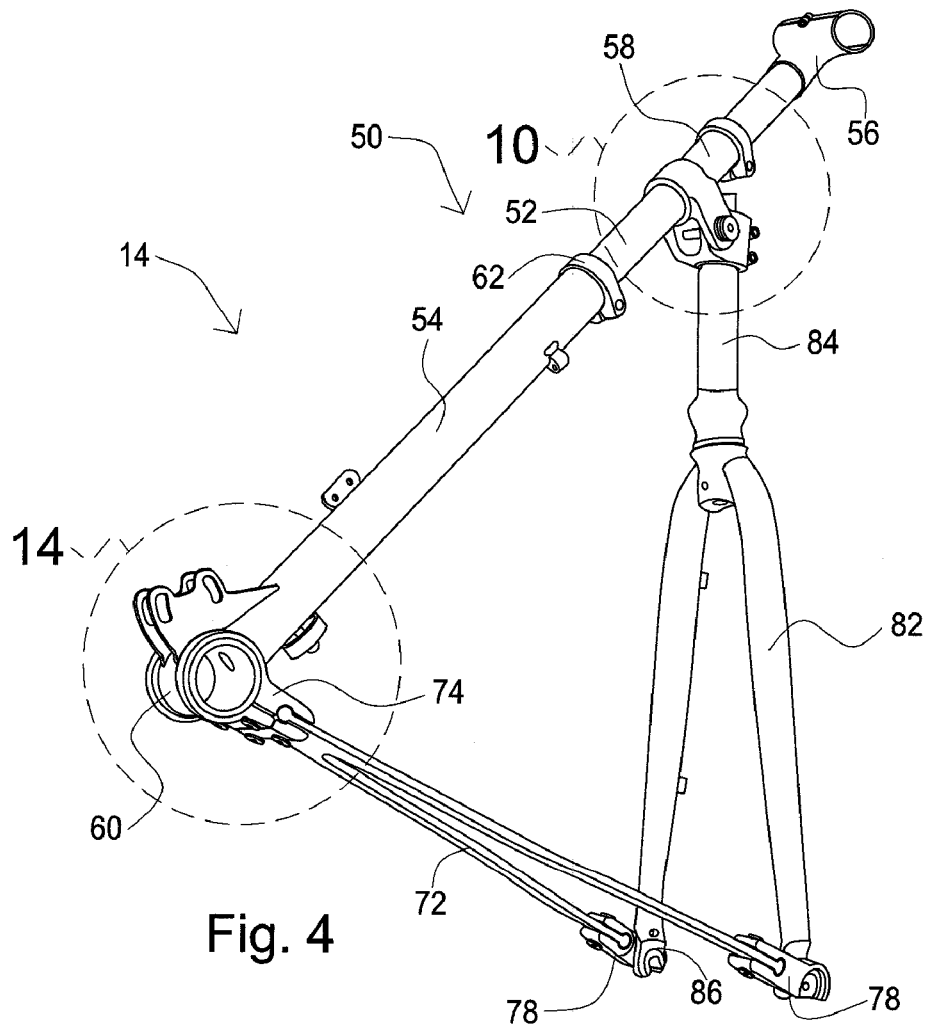
FIG. 4 is an isometric view of a front triangle of a front wheel drive recumbent bicycle frame according to one embodiment of the present invention.
Figure 5:
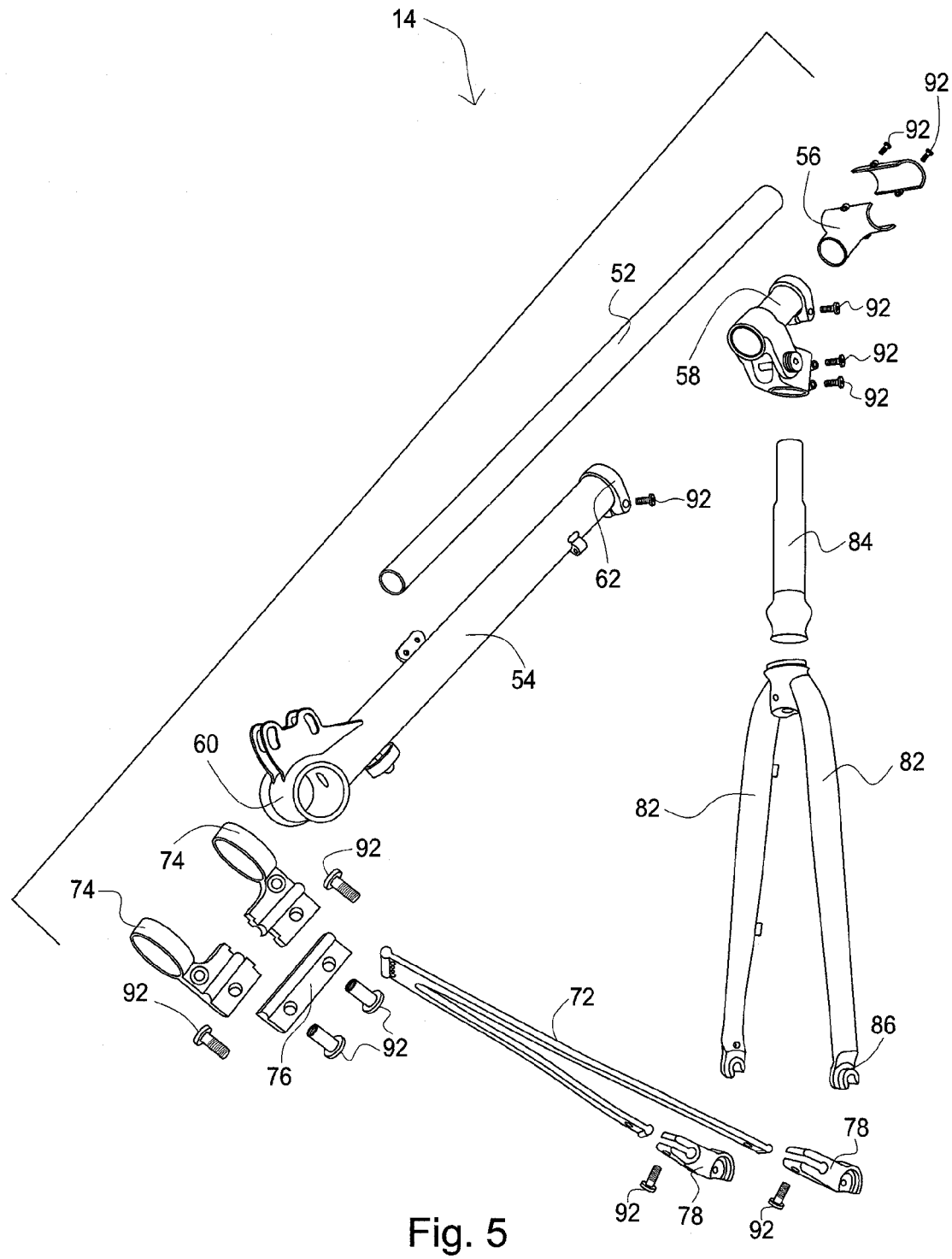
FIG. 5 is an exploded view of the front triangle according to an embodiment of the present invention.
Figure 6:
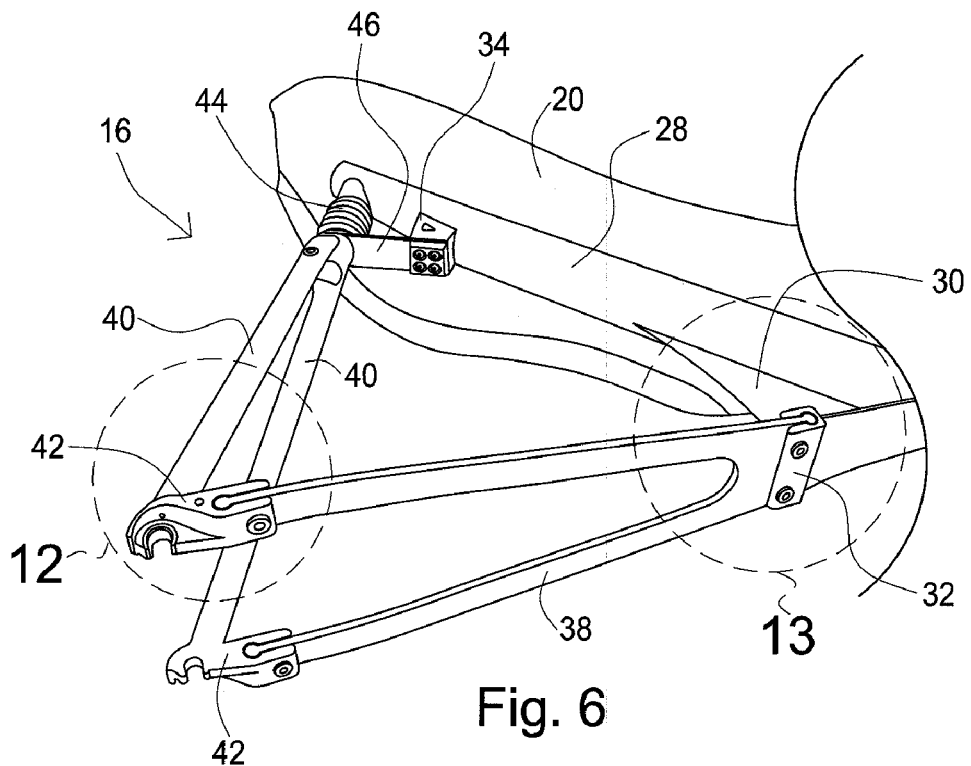
FIG. 6 is an isometric view of a rear triangle of a front wheel drive recumbent bicycle frame according to one embodiment of the present invention.
Figure 10:
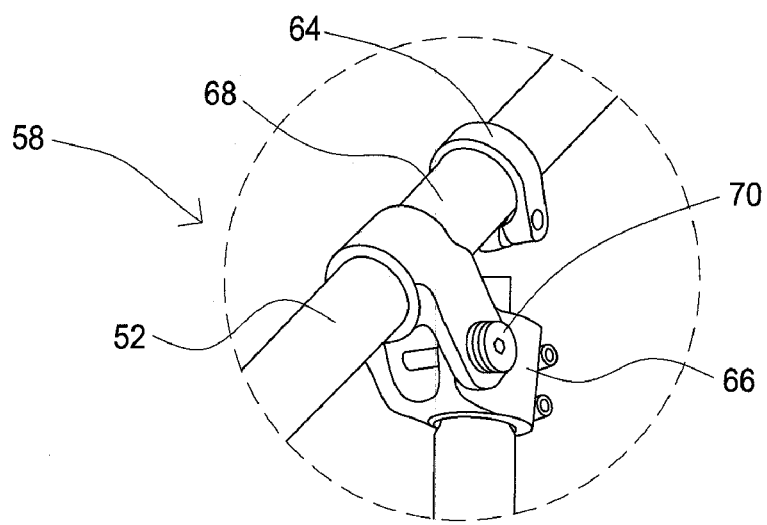
FIG. 10 is an isometric illustration of the steering tube mounting bracket of the front triangle according to an embodiment of the present invention.

As best shown in FIGS. 4, 5 & 10, the telescoping tube assembly 50 is best illustrated. The telescoping tube assembly includes: (i) the bottom bracket shell 60; (ii) a distal tube 54 structurally integrated with the shell (typically through welding when a metallic tube and shell are utilized); (iii) a proximal tube 52 that is typically slidably received into the distal tube permitting adjustments in the length of the assembly; (iv) a proximal tube ring clamp 62 secured around the proximal end of the distal tube permitting the proximal tube to be secured at a fixed longitudinal location relative to the proximal tube; (v) a handle bar mounting bracket 56; and (vi) a steering tube mounting bracket 58 for securing the assembly to the fork steering tube 84.

As indicated above the outer and distal tube 54 is typically comprised of a metallic material such as 6061 or 7005 aluminum alloy and is welded to the bottom bracket shell that comprises a similar material. In variations, however, other materials can be used and the shell and tube can be integrated or structurally joined in any suitable manner. As shown the inner and proximal tube 52 is received within the distal tube but in variations this can be flipped as well with the proximal tube receiving the distal tube therein.

In one embodiment, the proximal tube 52 is comprised of a carbon fiber composite material to save weight over a similarly strong and stiff metallic tube. In variations, however, metallic tubes can be utilized in place of composite tubing. The proximal tube is typically able to slide within the distal tube at least several inches and more preferably 6-12" to vary the distance of the bottom bracket shell from the seat pan 18 to adjust for riders of different leg lengths. The proximal tube ring clamp 62 can be tightened in place using a suitable fastener or a quick release fastener to secure the relative position of the proximal tube in the distal tube 54.

At the proximal end of the proximal tube the handlebar mounting bracket 56 is provided. In some embodiments the bracket can be adhesively or otherwise permanently secured to the proximal tube end or in other embodiments the bracket can be attached to the tube by way of a ring clamp permitting its removal. The handlebar mounting bracket includes a clamp for securing a standard bicycle handlebar therein.

As best shown in FIG. 10, the telescoping tube assembly 50 is secured to the steering tube 84 of the fork by way of the steering tube mounting bracket 58. As shown, a mounting bracket tube 68 of the steering tube mounting bracket is slidably received over the proximal tube 52 to move up and down the exposed portion thereof. At one end of the mounting bracket tube, a ring clamp 64 is provided for securing the steering tube mounting bracket at a fixed location along the proximal tube's length. On the lower end of the mounting bracket tube, clamp assembly 66 is provided for attaching to the top portion of the steering tube. The clamp assembly includes a ring clamp that is received over the steering tube and as illustrated includes dual fasteners to firmly secure the clamp in place on the steering tube. When loosened, the clamp can be moved upwardly and downwardly along the steering tube to a desired position. The ring clamp is pivotally attached to the bottom end of the mounting bracket tube by way of a finger clamp and an associated fastener 70. By loosening the fastener the angle between the mounting bracket tube and the steering tube ring clamp can be varied as may be necessary as the length of the telescoping tube assembly 50 is changed. When the appropriate length is set, the fastener 70 can be tightened to lock the angle.

As illustrated various cable stops and other bracketry can be provided on the various components of the front triangle as would be appropriate to route shift cables and mount the front derailleur to the triangle. Other bracketry can be provided so that mounting hardware to attach other components to the bicycle, such as a fairing, may also be provided. Also, the various fasteners used to couple the various components of the front triangle and other components of the bicycle frame together are generally referenced in the Figures by the element number "92". It is appreciated the sizes and specifications of the fasteners can vary relative to their location and use.

The bicycle including its associated components attached to the frame is illustrated in FIGS. 1 & 2. Of particular note is that the wheelbase of the frame is similar to that of a traditional upright-style road racing bicycle preferably under 43", more preferably under 41.5" and most preferably under 40.5" thereby permitting short radius handling and maneuvering similar to that of a traditional upright-style racing bicycle.

Embodiments of the bicycle are fitted with standard road bike wheel sets most typically comprising 650 c to 700 c size bicycle wheelsets 118. The wheels are typically also the same size front and rear unlike many recumbent designs which utilize smaller front wheels.

Additionally, embodiments are designed to accommodate standard road bicycle groups save for the seatpost that is included in some groups. Namely, the drivetrain comprising a front derailleur 110, a rear derailleur 112, a crankset 106 including a bottom bracket, pedals 108, a freewheel or cogset 116 and chain 114 are all interchangeable with a traditional road bike. Furthermore, the brakes 102 and associated brake/shift levers 104 are also standard traditional road bicycle componentry. Finally, the handlebar 120 also comprises any suitable traditional handlebar.

Because embodiments of the present invention accept standard road bicycle components, a rider is able to replace the components without having to special order them from a bicycle shop or the manufacturer and is able to select from an exceptionally wide array of compatible models and prices. Accordingly, the rider's ability to ride the recumbent bicycle is not substantially hindered or interrupted due to component availability or failure, and the rider can readily obtain a bicycle to his or her exact component specification.

A Method of Adjusting the Frame for Riders of Different Sizes Accordingly to an Embodiment One benefit of embodiments of the recumbent bicycle of the present invention is its ability to be adjusted to riders of varying sizes without significantly or substantially reducing the efficiency of the bicycle. Many recumbent bicycles have a means to adjust the position of the seat pan and seat back on the frame. This tends to increase the amount the seat flexes during hard riding such as sprinting and climbing and accordingly reduces the efficiency of the rider's power transfer. By fixing and making the seat pan and back part of the main frame's truss structure maximum stiffness of the seat is ensured. To ensure maximum stiffness of the adjustable front triangle, oversized ring clamps, such as at the bottom bracket shell are utilized to minimize, if not eliminate, flex or undesirable slippage of the front triangle.

In one embodiment of the bicycle, only two or three frame sizes need be produced to fit the large majority of potential riders. This compares well with traditional bicycles in which 5, 6 or more frames sizes would be required to fit the same range of riders. For instance for a medium frame size of one embodiment, the distance from the seat to the bottom bracket shell can be varied about seven inches to accommodate riders with significantly different leg lengths.

To adjust the front triangle for a differently sized rider than that which it was previously configured the bottom bracket shell ring clamps 74, the various fasteners of the steering tube mounting bracket assembly 58, and the proximal tube ring clamp 62 are all loosened. The quick release skewer that is holding the front wheel in place as well as holding the chainstay dropouts 78 firmly against the fork dropouts 86 may also be loosened somewhat to permit pivotal movement of the dropouts relative to each other but not enough to cause the front wheel to be dislodged from the fork dropouts. In at least one embodiment, the dropout in 86 is more precisely not a slot but a hole, so there is no possibility of the front wheel being removed unless the skewer is completely removed first which adds to the safety of the design.

Next, the length of the telescoping tube assembly 50 is adjusted such that the distance of the bottom bracket to the seat is the proper length for the new rider's leg length. In addition to adjusting the length for the rider's legs, the height and horizontal position of the handlebars can also be adjusted. Essentially, the amount of proximal tube 52 above the steering tube mounting bracket 58 relates to handlebar position adjustment while the length of the proximal tube below the steering tube mounting bracket relates to the adjustment for the bottom bracket shell position accounting for the rider's leg length. The position of the steering tube mounting bracket can also be moved upwardly and downwardly along the steering tube a short distance further affecting adjustment possibilities.

Once the appropriate lengths and positioning of the telescoping tube assembly are determined, the various clamps and fasteners are tightened to prevent slippage and movement of the front triangle. It is appreciated that in some adjustment procedures, the steering tube ring clamp of the steering tube mounting bracket need not be loosened given that the upwardly and downwardly adjustment range is typically very limited by the top of the steering tube.

I claim:

1. A front wheel drive recumbent bicycle frame comprising:
   a front triangle, the front triangle comprising, (i) a front fork having left and right fork blades and including one of (a) a steering tube and (b) a steering tube and steering tube shock combination, (ii) left and right chainstays, each chainstay having a proximal end coupled to a distal end of the respective fork blade, (iii) a bottom bracket shell coupled to a distal end of the chainstays, (vi) a telescoping tube assembly adjustable in length and fixable at any of a plurality of lengths, a distal end of the telescoping tube assembly being coupled to the bottom bracket shell and a proximal end thereof including a handlebar mounting bracket, and (v) a steering tube mounting bracket located between the proximal and distal ends of the telescoping tube assembly, the steering tube mounting bracket being coupled to the steering tube;

a rear triangle adapted to receive a non-driven rear wheel therein; and a main frame truss structure spanning between the front and rear triangles, the rear triangle being fixably secured to the main frame truss structure, and the front triangle being pivotally coupled to the main frame truss structure with the steering tube passing through a head tube of the main frame truss structure.

2. The bicycle frame of claim 1, wherein the main truss structure further includes a seat pan integrated therewith and forming an integral structural component of the main truss structure.

3. The bicycle frame of claim 2 wherein the main frame truss structure comprises a generally U-shaped truss comprising: (i) the head tube; (ii) a front truss portion integrated with the head tube and extending downwardly and rearwardly therefrom; (iii) a middle truss portion integrated with the front truss portion and extending generally horizontally rearwardly therefrom; (iv) a seat truss portion integrated with the middle truss portion and extending generally rearwardly and upwardly therefrom; (v) a seat back integrated with the seat truss portion; and (vi) the seat pan with the seat pan being integrated with (a) the seat truss portion and the seat back proximate a rear end thereof and (b) the front truss portion proximate a front end thereof, wherein the seat pan is spaced from and extends over the middle truss portion.

4. The bicycle frame of claim 3, wherein the front, middle and seat truss portions comprise tubes and wherein the seat back forms a top side of the seat truss portion tube.

5. The bicycle frame of claim 1, wherein the rear triangle comprises: (i) a pair of rear wheel stays comprising a composite material adapted to flex when subject to loading by way of the rear wheel, the rear wheel stays being coupled with the main frame truss structure at a proximal end; (ii) a pair of seat stays extending generally upwardly including a rear dropout at a distal end of each seat stay attached to a corresponding distal end of one of the real wheel stays, each dropout being adapted to receive the axle of a rear wheel therein; and (iii) a leaf spring attached to land extending from a top end of the pair of seat stays generally horizontally to a mounting location on the main frame truss structure, the leaf spring being adapted to flex with the movement of the seat stays when subject to loading by way of the rear wheel.

6. The bicycle frame of claim 5 further including an elastomeric dampener, the dampener being coupled to the main frame truss structure at a location directly above the top end of the pair of seat stays, the dampener adapted to dampen the upward movement of the seat stays and associated rear wheel while a bicycle using the bicycle frame is being ridden.

7. The bicycle frame of claim 1, wherein the left and right chainstays are comprised of a composite material adapted to flex when subject to loading by way of the front wheel.

8. The bicycle frame of claim 1, wherein the distal end of the chainstays is coupled to the bottom bracket by way of one or more ring clamps that encircle the exterior surface of the bottom bracket shell.

9. The bicycle frame of claim 8, wherein the one or more ring clamps are adapted to be tightened around the bottom bracket shell to prohibit rotation of the clamps relative to the shell in a first configuration of the front triangle and to be loosened so at least partial rotation about the bottom bracket shell is permitted in a second configuration of the front triangle.

10. The bicycle frame of claim 1, wherein the telescoping tube assembly comprises a distal tube and a proximal tube, one of the proximal and distal tubes being received in the other of the proximal and distal tubes, a position of the proximal tube relative to the distal tube being fixed in the front triangle first configuration and the position of the of the proximal tube relative to the distal tube being slidably adjustable in the front triangle second configuration.

11. The bicycle frame of claim 10, wherein the steering tube mounting bracket is received over one of the proximal and distal tubes, the steering tube mounting bracket being fixedly secured in the front triangle first configuration, and the steering tube mounting bracket being slidable along at least a portion of one of the proximal and distal tubes in the front triangle second configuration.

12. A method of adjusting the bicycle frame of claim 11 for persons of different sizes, the method comprising: (i) placing the front triangle into the second configuration; (ii) adjusting one or all of (a) the length of the telescoping tube assembly, (b) the angle of the telescoping tube assembly relative to the chainstays, and (c) the position of the steering tube mounting bracket along the telescoping tube assembly; placing the front triangle into the first configuration.

13. A recumbent bicycle utilizing the bicycle frame of claim 1.

14. The recumbent bicycle of claim 13, wherein a proximate center of a handlebar is aligned with a proximate center of a crankset axle substantially along the longitudinal axis of the telescoping tube assembly.

15. The recumbent bicycle of claim 13 comprising: front and rear wheel assemblies having a drivetrain including a rear derailleur, a front derailleur, a bottom bracket, a crankset, shifters and a chain.

16. A front wheel drive recumbent bicycle comprising:
a bicycle frame including,
a rear triangle adapted to receive a non-driven rear wheel therein,
a front triangle, the front triangle comprising, (i) a front fork having left and right fork blades and including one of (a) a steering tube and (b) a steering tube and steering tube shock combination, (ii) left and right chainstays, each chainstay having a proximal end coupled to a distal end of the respective fork blade, (iii) a bottom bracket shell coupled to a distal end of the chainstays, (vi) a telescoping tube assembly adjustable in length and fixable at any of a plurality of lengths, a distal end of the telescoping tube assembly being coupled to the bottom bracket shell and a proximal end thereof including a handlebar mounting bracket, and (v) a steering tube mounting bracket located between the proximal and distal ends of the telescoping tube assembly, the steering tube mounting bracket being coupled to the steering tube, and
a main frame truss structure spanning between the front and rear triangles, the main truss structure further including a seat pan integrated therewith and forming an integral structural component of the main frame truss structure,
wherein the rear triangle is fixably secured to the main frame truss structure, and the front triangle is pivotally coupled to the main frame truss structure with the steering tube passing through a head tube of the main frame truss structure;
a pair of bicycle wheels having similar diameters;
a handlebar mounted to the handlebar mounting bracket; and
a drive train including (a) a front derailleur, (b) a rear derailleur, (c) the bottom bracket shell, (d) a crankset, and e) a chain.

17. The front wheel drive recumbent bicycle of claim 16, wherein the front and rear triangles include suspensions.

* * * * *